(12) United States Patent
Trichês, Jr. et al.

(10) Patent No.: US 8,657,236 B2
(45) Date of Patent: Feb. 25, 2014

(54) AIRCRAFT PROVIDED WITH AERODYNAMIC SEAL FOR REDUCTION OF NOISE GENERATED BY AIRCRAFT CONTROL SURFACES

(75) Inventors: Mário Trichês, Jr., São José dos Campos (BR); Micael Gianini Valle do Carmo, São José dos Campos (BR); Bruno Arantes Caldeira da Silva, São José dos Campos (BR); Marcus Vinicius Franca Barboza, São José dos Campos (BR); Vinicius Losada Gouveia, São José dos Campos (BR)

(73) Assignee: Embraer S.A., São José dos Campos —SP (BR)

( * ) Notice: Subject to any disclaimer, the term of this patent is extended or adjusted under 35 U.S.C. 154(b) by 561 days.

(21) Appl. No.: 12/595,679

(22) PCT Filed: Mar. 27, 2008

(86) PCT No.: PCT/BR2008/000087
§ 371 (c)(1),
(2), (4) Date: Aug. 11, 2010

(87) PCT Pub. No.: WO2008/124901
PCT Pub. Date: Oct. 23, 2008

(65) Prior Publication Data
US 2010/0294883 A1    Nov. 25, 2010

(51) Int. Cl.
*B64C 23/00*    (2006.01)
(52) U.S. Cl.
USPC ...................................................... 244/199.1

(58) Field of Classification Search
USPC ................. 244/198, 199.1, 199.2, 199.4, 130
See application file for complete search history.

(56) References Cited

U.S. PATENT DOCUMENTS

| | | | |
|---|---|---|---|
| 3,630,313 | A | 12/1971 | Smith |
| 5,050,822 | A | 9/1991 | Whitehouse et al. |
| 5,613,649 | A | 3/1997 | Schlinker et al. |
| 5,738,298 | A | 4/1998 | Ross et al. |
| 5,749,546 | A | 5/1998 | Blackner et al. |
| 6,276,636 | B1 * | 8/2001 | Krastel .......................... 244/130 |
| 6,454,219 | B1 | 9/2002 | Moe |
| 6,491,260 | B2 | 12/2002 | Borchers et al. |
| 2001/0038058 | A1 | 11/2001 | Gleine et al. |
| 2003/0226936 | A1 | 12/2003 | Mau et al. |

OTHER PUBLICATIONS

International Search Report for PCT/BR2008/000087, mailed Dec. 3, 2008.
Written Opinion of the International Searching Authority for PCT/BR2008/000087, mailed Dec. 3, 2008.

* cited by examiner

*Primary Examiner* — Timothy D Collins
*Assistant Examiner* — Brian M O'Hara
(74) *Attorney, Agent, or Firm* — Nixon & Vanderhye P.C.

(57) ABSTRACT

Aircraft are provided with a perforated blade seal at the lower and/or upper side edges of a control surface contour, such as a flap, with the purpose of acting as a vortex generator, thereby making it difficult for the lower vortex system to move upwards and merge with the upper vortex system. The perforated blade seals are preferably arranged on the inboard and outboard edges of high lift flaps.

6 Claims, 3 Drawing Sheets

AIRCRAFT PROVIDED WITH AERODYNAMIC SEAL FOR REDUCTION OF NOISE GENERATED BY AIRCRAFT CONTROL SURFACES

This application is the U.S. national phase of International Application No. PCT/BR2008/000087 filed 27 Mar. 2008, which designated the U.S. and claims priority to Brazil Application No. PI 070143-4 filed 13 Apr. 2007, the entire contents of each of which are hereby incorporated by reference.

The present invention relates to suppression of noise aerodynamically generated by an aircraft, more specifically to the noise generated by control surfaces of aircraft such as flaps, slats, ailerons and spoilers. More particularly this invention relates to a seal for reduction of the aerodynamic noise generated by high lift flap side edges.

STATE OF ART

The technological progresses are greatly accompanied by a certain apprehension degree related to the environmental impacts caused by their application. The continuous evolution of transportation means is a clear example of the comfort generated by the possibility of a fast travel movement of the human being, but on the other hand, this fast movement can generate problematic consequences for the environment, with the effects of pollution and noise being important problems. For civil aviation, it is currently one of the main bottlenecks for further growth. The impact of aircraft noise is primarily a local nuisance issue in the residential area around airports, because it can interrupt communication, disturb sleep and relaxation, induce fatigue and thus reduces quality of life of population around airports. Hence, to date, noise issues have received more regulatory and technological attention than any other aviation environmental problem.

In the past 30-40 years, the aircraft industry has made notable steps forward concerning the efficiency of aircraft. Among other improvements, this progress has been accompanied by drastic reductions of noise emissions, largely achieved through optimized aerodynamics of the airframe and the new generation of turbo-fan engines.

For the air transport sector, economic growth is still forecast at about 5 percent per year. Therefore, noise issues will gain more and more importance under the aspects of quality of life and economic prosperity. If growth in air transport is not to be influenced negatively by additional regulations, it is necessary to bring both of these aspects into accordance. The sociopolitical importance of this issue is addressed in a range of research and development programs worldwide.

Noise and noise reduction issues will increasingly lead to additional design criteria in the development of new aircraft. Yet there is currently a lack of applicable design parameters and tools to implement such requirements, as certain noise generating processes are still not sufficiently understood.

The development and life cycles of an aircraft can encompass up to several decades. This is why time is an important factor to consider when introducing new technologies requiring rather long periods before they are spread over the aircraft fleets. Therefore, analysis of potential short and medium term solutions leading to retrofit measures for existing aircraft are required.

Aircraft landing and taking off are the chief sources of aviation noise noticed by the communities. During cruise phase, due to high operational altitudes, the noise generated by the aircraft is totally dissipated in the atmosphere and does not reach the population on the ground. During landing and take-off, however, the aircraft is close to the ground, and thus the aerodynamic and engine-generated noise sources are noticed easily by the communities, mainly those communities around airports.

A significant part of the noise generated by an aircraft during its operation is due to the airflow through the aircraft contours. This kind of noise is generally called aerodynamic noise, and is in great part caused by the air flowing over aircraft control surfaces and also by the discontinuities that these control surfaces cause on the aircraft wings. Aerodynamic noise is especially important at the landing phase of a flight, because in this situation the power required for the engines is reduced, thus the engine-generated noise also has its influence diminished. Moreover, at this phase of flight the high-lift devices are often extended, which increases the generated aerodynamic noise.

Modern commercial passenger transport aircraft are equipped with high lift auxiliary devices that are typically deployed during take-off and/or landing phases of a flight in order to increase the lift generated during relatively low flight speeds. These high lift auxiliary devices include leading edge slats and landing flaps, which are respectively movably connected to the leading edge are and the trailing edge area of a main wing. In the extended or deployed positions, there high lift auxiliary devices, in addition to the extended landing gear, represent the major generators of aerodynamic flow noise of commercial transport aircraft.

Significant studies have been performed within the last years on the mechanisms and the modeling of high lift device noise sources, providing a number of numerical, semi-analytical and semi-empirical modeling approaches for the local flow unsteadiness, which is the drive of the far field acoustics. In addition to these studies remarkable reductions of slat noise as well as flap side edge noise at the source have been demonstrated.

It is known from literature that significant aerodynamic noise is generated by vortices that occur at aircraft wing and control surfaces edges. The elimination or weakening of these vortices is a very effective way to reduce overall aircraft aerodynamic noise.

Based on the mentioned above, it has long been a serious problem and the subject of substantial research in the field of aircraft design, to reduce the aerodynamically generated noise of the air flowing over various aircraft structures, and especially the extended trailing edge flaps.

Current approaches for solving this problem are the installation of vortex generators on the edges of aircraft control surfaces. These elements generate smaller vortices that weaken the main vortex that otherwise be generated in these parts of the aircraft, thus reducing the aerodynamic noise. Currently existing patents use elements such as bristles and rods to achieve this effect of vortex shedding. Although being effective on its purpose of noise reduction, these solutions are very difficult to be retrofitted in existing aircraft, because they require the existence of a considerable gap between aircraft control surfaces to be effectively installed. So they are more suitable for use in new aircraft, where these gaps might be dimensioned for making room for the brushes or rods.

Prior art regarding solutions for flap side edge noise involves the application of flap fences, porous flap side edges, rods at flap side edge contours, brushes and active blowing, and they can be seen in U.S. Pat. Nos. 6,491,260, 5,738,298, 5,050,822 and 5,613,649.

Flap fences are perpendicular side plates mounted at the flap side edge (see U.S. Pat. No. 5,738,298). The plate may protrude into the flow only at the lower side of the flap, only at the upper side or for both directions. With the fences, the merging process between the lower and upper vortex subsystems is avoided as well as the interaction of the merged vortex with the flap suction surface. As a consequence, the radiated noise is reduced. However, for aircraft that are already in operation, sometimes the installation of flap fences cannot be performed in such a way that they are positioned aligned with the flow direction. As a consequence, there is a penalty on drag during cruise conditions.

Application of porous side edges or brushes (elongated elements) on the flap side surfaces has shown a good performance in terms of noise reduction (see U.S. Pat. No. 6,491, 260). Besides the fact that the porous material works as an acoustic absorber, the steady leakage flow completely changes the mean local flow field and the associated dual vortex system. The last mechanism is also valid when brushes are used on the flap side edges. The drawbacks are related with the need of a gap between the main wing and the control surface (flap) in order to make room for the porous material or brush when flap is retracted (cruise configuration).

The application of rods and serrations on the flap side edge sharps falls on the same drawbacks as previously shown for brushes and porous side edges. When the flap control surface is retracted, there is no space enough to case the rods.

Active blowing is related to the introduction of a forced flow into the local mean flap side edge flow field. This makes the shear layer concentrated on several small vortices and suppresses the interaction of the turbulences with the flap surfaces, reducing the effect of the dipole acoustic source. However, such solution is not economical in cost and difficult to implement.

SUMMARY OF THE INVENTION

According with the mentioned above, it is clear that the development of a solution for the aerodynamic generated noise from the trailing edge flaps that conciliates the requirements of low cost, easy retrofit on operating aircrafts, low weight and little or no influence on drag/lift has been a challenge confronting engineers during the last decades.

Flap side edge noise mechanisms have been discussed in a large number of publications. Such studies often involve Computational Fluid dynamic (CFD) calculations, wind tunnel and flight testing.

The most reasonable explanation found in the literature regarding flap side edge noise mechanisms deals about a specific vortex system that emanates from the flap side edge (see Dobrietz and Borchers). The tip vortex generation is caused by the static pressure difference between upper and lower flap surfaces. The vortex system under discussion is particularly characterized by the fact that in the flap upstream region two separate vortices are generated, one at the lower edge of the flap side contour, one at the upper edge. As the chord length increases, the lower vortex subsystem (which emanates from the flap lower edge) follows the mean stream lines and moves upwards. When it passes through the upper edge of the flap side contour, it interacts and merges with the upper vortex subsystem (which emanates from the flap upper edge). This merging process leads to a single side edge vortex, which is continuously fed with vorticity from the shear layer emanating from the lower edge of flap side contour. As a consequence, it is produced a strong jet-like flow in the vortex core with high streamwise velocities. As long as the chord length increases, the merged vortex system leaves the flap surface and moves upwards.

Before proposing a possible solution for the flap side edge noise phenomena, it is essential to figure out the noise generation mechanisms that are involved.

Again, accordingly with Dobrietz and Borchers[x], the following noise generation mechanisms can be derived from the previously described local mean flow fields:

i. Trailing edge noise and flow separation at the sharp edges.

Basically, two noise mechanisms are present in this group. The first one is caused by the Turbulent Boundary Layer (TBL) formed at the pressure side of the flap. The developed TBL travels across the lower flap side edge, and the flow pressure fluctuations are partially converted into acoustically radiated noise. The second mechanism is the TBL developed at the flap side surface, which separates at the upper flap side edge and radiates noise in the same way as mentioned above.

ii. The vortex pressure fluctuations at the flap side edge interact with the flap side edge surface and with the upper sharp side edge. Since this vortex system is fed by shear layer instabilities emanating from the lower side edge, it shows an oscillating and rotating vorticity field.

iii. Merging of the two vortex subsystems. The merged vortex pressure fluctuations interact with the flap suction side and the upper sharp side edge.

From the acoustics point of view, the previously discussed mechanisms represent sound sources as monopoles, dipoles and quadrupoles. As a consequence, the total acoustic contribution is broadband in nature. However, tonal contributions may arise when the oscillations and rotating instabilities within the vorticity field exhibit a periodic character.

In view of the above, in order to be effective as a noise control measure, any solution to be applied on the trailing edge flaps must act towards weakening the vortex subsystems generated at the lower and/or upper flap side edge contour, aiming to avoid any merging between them. In addition, since the merge process is avoided, the monopole, dipole and quadrupole acoustic sources represented by the jet-like flow in the vortex core, by the vortex pressure fluctuations acting with the flap upper surface and by the oscillating and rotating instabilities within the vorticity field respectively are substantially reduced, the resulting radiated noise decreases as well.

It is important to point out here that the inventive arrangement shall not significantly detract from the proper aerodynamic characteristics of the trailing edge flaps. In addition, the invention further aims to avoid or overcome the drawbacks of the existing solutions.

It is proposed a new project for reduction of the aerodynamic noise generated by the wing and control surfaces of an aircraft. This goal is reached through an aerodynamic seal to be installed between the fixed parts of the aircraft and its control surfaces, having a larger width than the space among the surfaces and with perforations covering its extension. These perforations will generate small vortexes that will weaken the main vortex generated in these extremities (edges), without any aerodynamic disadvantage when the aircraft is in the cruise configuration. Further, this project can be installed easily in already existent aircrafts, once it just requests the change of the common aerodynamic seals that are already installed on the aircraft.

Therefore, for reduction of the noise generated by the edges of the side contours of the flap during the approach phase and landing of commercial airplanes flightz, and also for accomplishment of characteristics of low cost, weight, and easy installation, the perforated sheet seal applied in an extended way on the pressure side of a high flap flap of the invention is a new solution for the problem.

With the extended width, the lower vortex subsystem that is generated at the lower sharp edge of the flap is prevented of moving upwards. As a consequence, the merging process with the upper vortex subsystem is substantially reduced.

Since the merged process is avoided or made more difficult, the amount of noise radiated into the far field is also substantially reduced. The perforations along the blade seal length have the purpose to work as a vortex generator, creating a great number of relatively small individual vortices, avoiding the feed of the main merged vortex with the energy that usually come from the vortices generated at the lower flap sharp edge. The reduction of the strength of the main merged vortex does not reduce the aerodynamic effect of the control surface (lift generated by flaps). In addition the perforations reduce the seal stiffness at certain positions inducing a back and forth movement when it is exposed to the flow, also contributing for the vortex generator performance.

Although the perforations along the blade seal length contributes to generate smaller vortices, even these vortices and their interaction with the flap and main wing surfaces work as acoustic sources (quadrupoles and dipoles). However, such sources are less effective in terms of noise generation than the undisturbed large merged vortex.

In a preferred embodiment of the invention, the extended and perforated blade seals are arranged on the lower and/or upper edges of the control surface, particularly of a flap. However, these modified seals might be used in any part of the aircraft where it is desired to reduce the noise generated by tip vortices. The geometric characteristics of the seal and of the perforations, such as size, shape and number might be optimized for better performance. The blade seal can be applied along the entire surface chord or only in some parts.

An important advantage of this invention is that it is relatively inexpensive and simple in construction, with a relatively low installation effort for aircraft that are already in operation (retrofit). Moreover, the solution is rather light in weight and do not cause any significant prejudicial effect on the performance of the control surface.

BRIEF DESCRIPTION OF DRAWINGS

Since all the characteristics of the previously discussed invention shall be completely understood, a set of drawings will be provided in order to describe the invention features and the manner of attaining them. The referenced figures are described as follows.

DETAILED DESCRIPTION OF A PREFERRED EXAMPLE EMBODIMENT AND OF THE BEST ACCOMPLISHMENT MODE OF THE INVENTION

Figure 1:
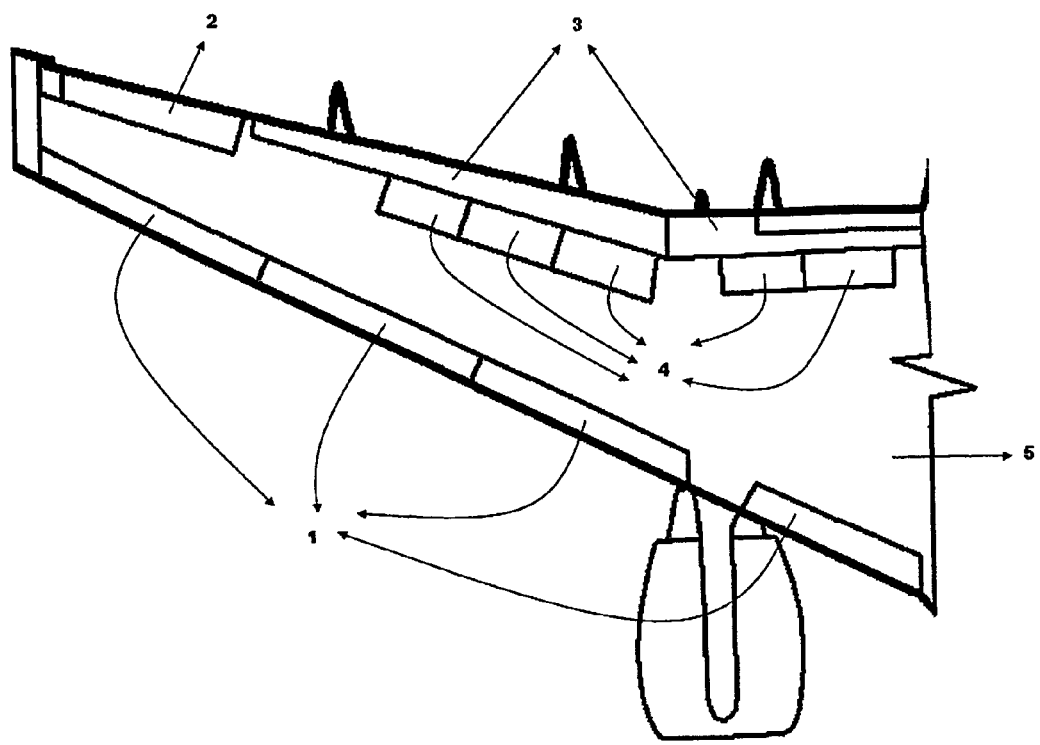
FIG. 1 is a schematic top plan view of an aircraft wing showing the high lift system, comprised of plurality of flaps and slats.

FIG. 1 shows an aircraft which includes a main element 5 (wing) and a high lift system composed by elements 1 and 3.

In the example represented herein, the high lift system comprises a plurality of movable components, such as a trailing edge assembly formed of a plurality of adjacent flaps 3 and a leading edge assembly 1 formed of a plurality of slats. Spoilers 4 and an aileron 2 are also seen in this figure.

The reduction of the aerodynamic generated noise becomes significant only during the approach and landing phase of flight of an aircraft. During take-off procedures, the engines are set at full power and the noise generated by the high lift devices is completely masked. Moreover, for the majority of take-off procedures both slats and flaps are partially extended and are retracted shortly after lift-off in order to improve the lift-over-drag ratio of the climbout configuration. On the other hand, during landing, both slats 1 and flaps 3 are fully extended. In addition, the engine power set is kept at minimum and the aircraft is relatively close to the ground, where the noise is perceived. As a consequence, noise emanating from the high lift system devices becomes a very important issue to be controlled.

Figure 2:
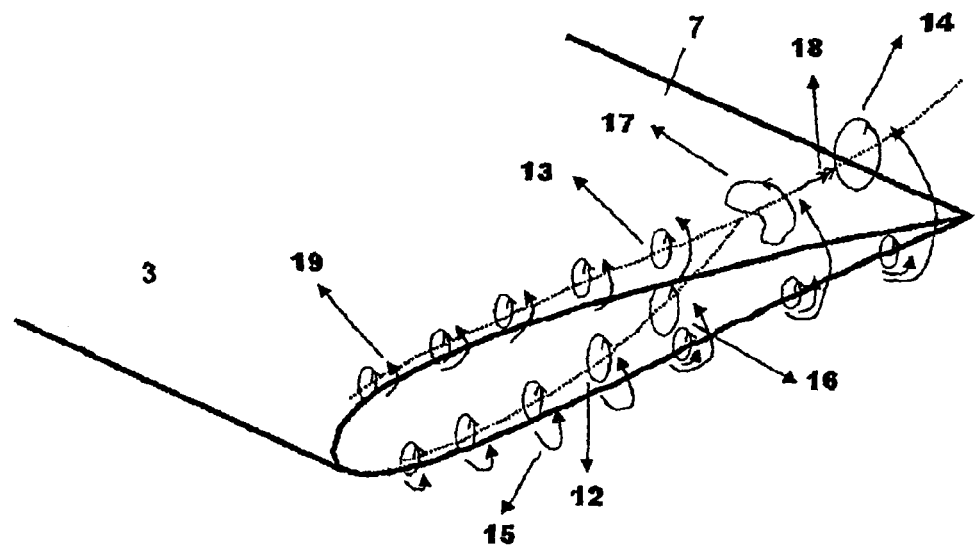
FIG. 2 is an isometric view of a high lift flap that illustrates a simplified scheme for the flap side edge local flow field, showing the mechanisms that are most widely accepted as possible explanations for flap side edge noise generation.

From FIG. 2 it can be noticed that the turbulent boundary layer 15 and 19 generated at both the pressure 10 and suction 9 surfaces respectively of the high lift flap travels across the lower 11 and upper 8 side edge. In addition, the turbulent boundary layer on the side of the flap 12 travels across and separates at the upper flap side edge 8. The pressure fluctuations from the side edge vortex 16 interact with the flap side surface and with the upper sharp side edge 8, creating an acoustic dipole. As the vortices generated at the lower flap side edge and at the flap side edge moves upwards, the merging between them and the upper vortices 13 can be verified 17. This merging process creates acoustic monopoles, dipoles and quadrupoles sources. The upper flow passing through the merged vortex 14 creates a jet-like noise close to the flap trailing edge 7, which represents the acoustic monopole. The interaction between the upper vortex subsystem 13 and the merged vortex 14 with the flap upper surface represents the acoustic dipole. Pressure fluctuations associated with the upper (13, 19), side (12) and lower (15) vortex subsystems, as well as the merged vortex (14, 17) represent the acoustic quadrupole.

Figure 3:
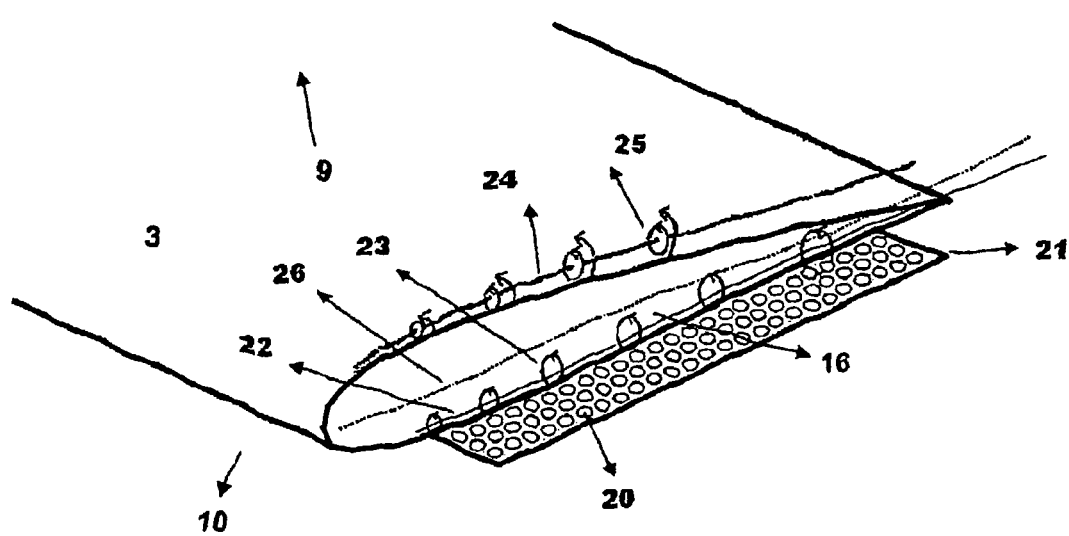
FIG. 3 is an isometric view of a high lift flap with the proposed extended and perforated blade seal applied on the flap lower sharp edge. The expected side edge local flow field due to the application of the proposed invention is also show in this figure.

Based on the foregoing being presented as background information, focus now will be directed to a more detailed description of the invention proposed herein. Description of the first and preferred embodiment of the present invention is made with reference to FIG. 3. It can be noticed that the extended and perforated blade seal is installed at the pressure surface 10 of the high lift flap, characterizing a design change on the current blade seals used at this same position 6. The seal extends beyond the flap sharp edge contour. With the proposed extended and perforated seal 21 installed, the turbulent boundary layer generated at the flap pressure surface 22 is prevented of traveling across the lower sharp side edge 15. As a consequence, the flap side edge vortex 23 is not fed by the shear layer instabilities emanating from the flap pressure surface 16, which represents a reduction on acoustic dipoles and quadrupoles originally generated. The large scale flap side edge vortex 23 is replaced by a great number of small scale vortices. Moreover, since the interaction between the lower and side edge vortex systems 16 are reduced, they are prevented of moving upwards and merge with the upper vortex 17, hence, avoiding the generation of acoustic monopoles, dipoles and quadrupoles. However, for the described embodiment, the interaction between the flap side edge turbulent boundary layer 26 of the side edge 16 with upper turbulent boundary layer 24 remains unchanged, leading to a strong interaction between the upper vortex 25 with the flap suction side 9.

Figure 4:
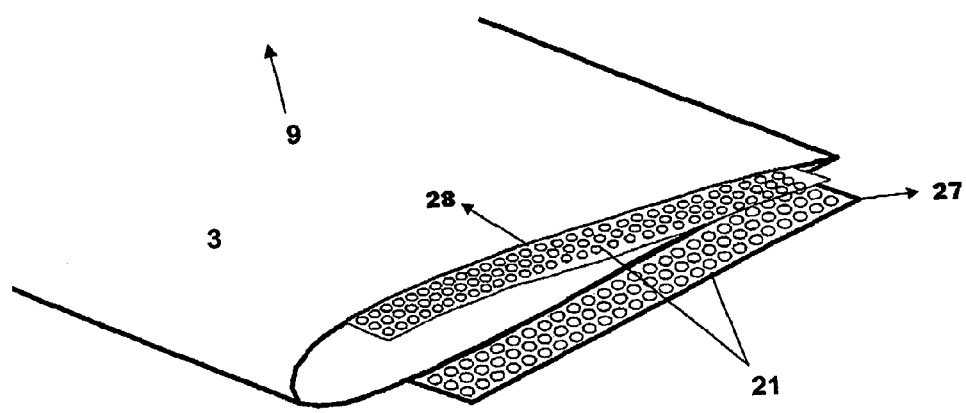
FIG. 4 is an isometric view of a high lift flap showing the application of the extended and perforated blade seal at both lower and upper flap sharp edge.

An alternative embodiment for the invention being presented is shown in FIG. 4. It can be noticed that the extended and perforated blade seal is applied at both pressure 27 and suction side 28 of this high lift flap 3. With this embodiment, in addition to the behavior aforementioned discussed for the first embodiment, the interaction between the flap side edge turbulent boundary layer with the flap upper surface turbulent boundary layer 24 (see FIG. 3) is also reduced. As a result, the interaction between the upper vortex 25 with the flap suction surface 9 is substantially reduced.

Figure 5:
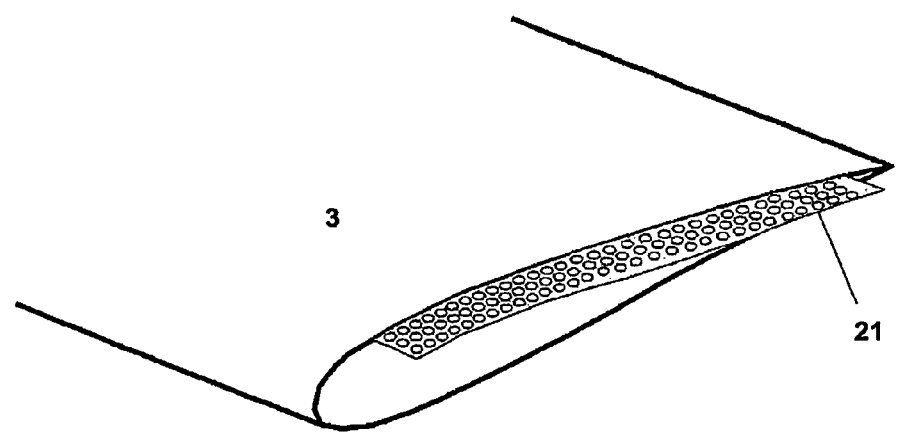
FIG. 5 is an isometric view of a high lift flap showing the application of the extended and perforated blade seal at the upper flap sharp edge.

The last embodiment is shown in FIG. 5. Here the extended and perforated blade seal is applied only at the flap 3 upper surface, extending beyond the upper sharp edge.

The extended and perforated seal 21 can be applied at least to an edge of any other elements of the wing 5, such as slat 1, spoiler 4, rudder (located on the fuselage, not shown in the figures) and aileron 2. For all the embodiments described before, the size, position and number of the perforations 20 can be tuned in order to achieve the best performance in terms of noise reduction.

It was described an example of favourite materialization of the invention, and it should be understood that the scope of the present invention includes other possible variations, and it is only limited by the tenor of the attached claims, comprising its possible equivalents.

The invention claimed is:

1. An aircraft comprising:
    a fuselage; and
    a wing comprising a high-lift system which includes at least one high-lift flap extending in a lengthwise direction along the wing laterally adjacent to the fuselage, wherein
    the at least one high-lift flap includes leading and trailing edges defining a chord line therebetween, an outboard end facing away from the fuselage, and an inboard end facing toward the fuselage, wherein the flap defines a an upper lift surface and a lower pressure surface between the leading and trailing edges, thereof, the upper lift and lower pressure surfaces defining respective upper and lower profile edges at each of the outboard and inboard ends of the flap, respectively; wherein
    the at least one high-lift flap includes an aerodynamic seal for reduction of noise aerodynamically generated by the at least one high-lift flap of the aircraft, wherein
    the aerodynamic seal comprises upper and lower planar perforated blade seal strip elements conforming to the upper lift and lower pressure surfaces of the high lift device, respectively, wherein the upper and lower blade seal strip elements outwardly protrude from the upper and lower profile edges, respectively, at each of the outboard and inboard ends of the flap so as to be separated from one another by a thickness dimension of the at least one high-lift flap, and wherein
    each of the upper and lower seal strip surfaces extend a predetermined distance between the leading and tailing edges in a direction of the chord line thereof.

2. The aircraft according to claim 1, wherein each of the upper and lower planar perforated blade seal strip elements is positioned so as to disrupt formation of a single large vortex of air flowing across the upper and lower profile edges, respectively, of the at least one high-lift flap.

3. The aircraft according to claim 1, wherein each of the planar perforated blade seal strip elements has a widthwise dimension extending beyond the respective upper and lower profile edges of the high-lift flap which is in a range from 10 to 300 mm.

4. The aircraft according to claim 1, wherein each of the planar perforated blade seal strip elements is configured with perforations having a predetermined geometric pattern.

5. The aircraft according to claim 1, wherein each of the planar perforated blade seal strip elements is arranged along the upper and lower profile edges, respectively, between the leading and trailing edges of the high-lift flap by a predetermined distance totaling at least one third of a chord length of the high-lift flap.

6. The aircraft according to claim 1, wherein each of the planar perforated blade seal strip elements is configured with perforations having different shapes and dimensions.

* * * * *